US011351880B2

(12) United States Patent
Singuru et al.

(10) Patent No.: US 11,351,880 B2
(45) Date of Patent: Jun. 7, 2022

(54) METHODS AND SYSTEMS FOR ALIGNMENT OF WIRELESS CHARGING MODULES

(71) Applicant: GM GLOBAL TECHNOLOGY OPERATIONS LLC, Detroit, MI (US)

(72) Inventors: Kausalya Singuru, Troy, MI (US); Suresh Gopalakrishnan, Troy, MI (US); Nikolai K. Moshchuk, Grosse Pointe, MI (US); David Andrés Pérez Chaparro, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 16/553,326

(22) Filed: Aug. 28, 2019

(65) Prior Publication Data

US 2021/0061117 A1 Mar. 4, 2021

(51) Int. Cl.
*B60L 53/38* (2019.01)
*B60L 53/36* (2019.01)
*B60L 53/66* (2019.01)
*B60L 53/30* (2019.01)
*B60L 53/122* (2019.01)

(52) U.S. Cl.
CPC ............ *B60L 53/38* (2019.02); *B60L 53/122* (2019.02); *B60L 53/305* (2019.02); *B60L 53/36* (2019.02); *B60L 53/665* (2019.02)

(58) Field of Classification Search
CPC ............ B60L 53/35; B60L 53/14; B60L 53/16
See application file for complete search history.

(56) References Cited

U.S. PATENT DOCUMENTS

| | | | | |
|---|---|---|---|---|
| 2011/0285349 | A1* | 11/2011 | Widmer | ............... B60L 53/126 |
| | | | | 320/108 |
| 2012/0306443 | A1* | 12/2012 | Smith | ................... H02J 7/0042 |
| | | | | 320/109 |
| 2016/0347193 | A1* | 12/2016 | Caldwell | ................. B60L 53/38 |

* cited by examiner

*Primary Examiner* — David V Henze-Gongola
(74) *Attorney, Agent, or Firm* — Quinn IP Law (57) ABSTRACT

An automotive vehicle includes a vehicle-based charging unit including a receiving unit configured to receive power from a ground-based charging unit, the receiving unit including a multi-coil receiver, a first actuator operably coupled to the vehicle-based charging unit and configured to adjust a first position of the vehicle-based charging unit relative to the ground-based charging unit, and a controller configured to selectively actuate the first actuator. The controller is configured to receive first performance indicator data indicating a first alignment between the charging units, determine an alignment error between the charging units and calculate a first position adjustment of the vehicle-based charging unit, automatically control the first actuator to implement the first position adjustment of the vehicle-based charging unit, and receive second performance indicator data indicating a second alignment between the charging units, the second alignment resulting in a desired power transfer efficiency between the charging units.

20 Claims, 4 Drawing Sheets

METHODS AND SYSTEMS FOR ALIGNMENT OF WIRELESS CHARGING MODULES

INTRODUCTION

The present disclosure relates generally to wireless charging solutions and more specifically to methods and systems to improve alignment between a vehicle-based charging unit and a ground-based charging unit.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Electric vehicles include chargeable systems, such as wired or wireless charging systems. Wireless power transfer (WPT) systems provide one example of a wireless transfer of energy between a ground-based charging unit and a vehicle-based charging unit. However, efficient power transfer and charging depends on the alignment between the ground-based charging unit and the vehicle-based charging unit. While driver-assistance systems may help guide the vehicle-based charging unit to an alignment position relative to the ground-based charging unit, more precise alignment between the vehicle-based and ground-based units may be achieved with the embodiments discussed herein.

SUMMARY

Embodiments according to the present disclosure provide a number of advantages. For example, embodiments according to the present disclosure enable more precise alignment between the vehicle-based and ground-based charging units to improve charging efficiency.

In one aspect of the present disclosure, a method for adjusting a relative position of a vehicle-based charging unit of a vehicle and a ground-based charging unit includes providing a first actuator operably coupled to the vehicle-based charging unit and configured to adjust a first position of the vehicle-based charging unit relative to the ground-based charging unit and a controller configured to selectively actuate the first actuator. The method further includes receiving, by the controller, first performance indicator data indicating a first alignment between the vehicle-based charging unit and the ground-based charging unit, the first performance indicator data indicating a misalignment between the vehicle-based charging unit and the ground-based charging unit. The method also includes determining, by the controller, an alignment error between the vehicle-based charging unit and the ground-based charging unit and calculating a first position adjustment of the vehicle-based charging unit and automatically controlling, by the controller, the first actuator to implement the first position adjustment of the vehicle-based charging unit. The method also includes receiving, by the controller, second performance indicator data indicating a second alignment between the vehicle-based charging unit and the ground-based charging unit, the second alignment resulting in a desired power transfer efficiency between the vehicle-based charging unit and the ground-based charging unit.

In some aspects, the first position adjustment is an adjustment to a lateral position, a longitudinal position, or both of a lateral and a longitudinal position of the vehicle-based charging unit.

In some aspects, the method further includes providing a second actuator operably coupled to the vehicle-based charging unit and configured to adjust a second position of the vehicle-based charging unit relative to the ground-based charging unit, wherein an adjustment to the first position is an adjustment of the vehicle-based charging unit in a lateral direction and an adjustment to the second position is an adjustment of the vehicle-based charging unit in a longitudinal direction and the controller is configured to selectively actuate both of the first and second actuators to implement the first position adjustment of the vehicle-based charging unit.

In some aspects, the method further includes determining, by the controller, a second position adjustment of the vehicle-based charging unit and automatically controlling, by the controller, at least one of the first and second actuators to implement the second position adjustment of the vehicle-based charging unit.

In some aspects, the second position adjustment is an adjustment to a lateral position, a longitudinal position, or both of a lateral and a longitudinal position of the vehicle-based charging unit.

In some aspects, the method further includes determining, by the controller, if a first movement threshold has been reached for the first actuator, and in response to the first actuator reaching the first movement threshold, generating, by the controller, a first fault code indicating an incomplete alignment between the vehicle-based charging unit and the ground-based charging unit.

In some aspects, the method further includes determining, by the controller, if a second movement threshold has been reached for the second actuator, and in response to the second actuator reaching the second movement threshold, generating, by the controller, a second fault code indicating an incomplete alignment between the vehicle-based charging unit and the ground-based charging unit.

In some aspects, the first performance indicator data includes power transfer efficiency data between the vehicle-based charging unit and the ground-based charging unit and when the vehicle-based charging unit and the ground-based charging unit are misaligned, the power transfer efficiency data is below a power transfer efficiency threshold.

In some aspects, the second performance indicator data indicates an increasing power transfer efficiency between the vehicle-based charging unit and the ground-based charging unit.

In some aspects, the vehicle-based charging unit includes a first plurality of coils and the ground-based charging unit includes a second plurality of coils and the second alignment includes alignment of at least one of the first plurality of coils with at least one of the second plurality of coils such that the second performance indicator data indicates an improved power transfer efficiency between the ground-based charging unit and the vehicle-based charging unit.

In another aspect of the present disclosure, a method for adjusting a relative position of a vehicle-based charging unit of a vehicle and a ground-based charging unit includes providing a first actuator operably coupled to the ground-based charging unit and configured to adjust a first position of the ground-based charging unit relative to the vehicle-based charging unit and a controller configured to selectively actuate the first actuator. The method includes receiving, by the controller, first power transfer efficiency data indicating a first alignment between the vehicle-based charging unit and the ground-based charging unit, the first power transfer efficiency data indicating a misalignment between the vehicle-based charging unit and the ground-based charging unit. The method also includes determining, by the controller, an alignment error between the vehicle-based charging unit and the ground-based charging unit and calculating a first position adjustment of the ground-based charging unit and automatically controlling, by the controller, the first actuator to implement the first position adjustment of the ground-based charging unit. The method further includes receiving, by the controller, second power transfer efficiency data indicating a second alignment between the vehicle-based charging unit and the ground-based charging unit, the second alignment resulting in a desired power transfer efficiency between the vehicle-based charging unit and the ground-based charging unit.

In some aspects, the method further includes providing a second actuator operably coupled to the ground-based charging unit and configured to adjust a second position of the ground-based charging unit relative to the vehicle-based charging unit, wherein an adjustment to the first position is an adjustment of the ground-based charging unit in a lateral direction and an adjustment to the second position is an adjustment of the ground-based charging unit in a longitudinal direction and the controller is configured to selectively actuate both of the first and second actuators to implement the first position adjustment of the ground-based charging unit.

In some aspects, the method further includes determining, by the controller, a second position adjustment of the ground-based charging unit and automatically controlling, by the controller, at least one of the first and second actuators to implement the second position adjustment of the ground-based charging unit.

In some aspects, when the vehicle-based charging unit and the ground-based charging unit are misaligned, the power transfer efficiency data is below a power transfer efficiency threshold.

In some aspects, the second power transfer efficiency data indicates an increasing power transfer efficiency between the vehicle-based charging unit and the ground-based charging unit.

In some aspects, the vehicle-based charging unit includes a first plurality of coils and the ground-based charging unit includes a second plurality of coils and the second alignment includes alignment of at least one of the first plurality of coils with at least one of the second plurality of coils such that the second power transfer efficiency data indicates an improved power transfer efficiency between the ground-based charging unit and the vehicle-based charging unit.

In yet another aspect according to the present disclosure, an automotive vehicle includes a vehicle-based charging unit including a receiving unit configured to receive power from a ground-based charging unit, the receiving unit including a multi-coil receiver, a first actuator operably coupled to the vehicle-based charging unit and configured to adjust a first position of the vehicle-based charging unit relative to the ground-based charging unit, and a controller configured to selectively actuate the first actuator. The controller is configured to receive first performance indicator data indicating a first alignment between the vehicle-based charging unit and the ground-based charging unit, the first performance indicator data indicating a misalignment between the vehicle-based charging unit and the ground-based charging unit, determine an alignment error between the vehicle-based charging unit and the ground-based charging unit and calculate a first position adjustment of the vehicle-based charging unit based on the alignment error, automatically control the first actuator to implement the first position adjustment of the vehicle-based charging unit, and receive second performance indicator data indicating a second alignment between the vehicle-based charging unit and the ground-based charging unit, the second alignment resulting in a desired power transfer efficiency between the vehicle-based charging unit and the ground-based charging unit.

In some aspects, the automotive vehicle further includes a second actuator operably coupled to the vehicle-based charging unit and configured to adjust a second position of the vehicle-based charging unit relative to the ground-based charging unit, wherein an adjustment to the first position is an adjustment of the vehicle-based charging unit in a lateral direction and an adjustment to the second position is an adjustment of the vehicle-based charging unit in a longitudinal direction and the controller is configured to selectively actuate both of the first and second actuators to implement the first position adjustment of the vehicle-based charging unit.

In some aspects, the controller is further configured to determine a second position adjustment of the vehicle-based charging unit and automatically control at least one of the first and second actuators to implement the second position adjustment of the vehicle-based charging unit.

In some aspects, the controller is further configured to determine if a first movement threshold has been reached for the first actuator, and in response to the first actuator reaching the first movement threshold, generate a first fault code indicating an incomplete alignment between the vehicle-based charging unit and the ground-based charging unit, and the controller is further configured to determine if a movement threshold has been reached for the second actuator, and in response to the second actuator reaching the second movement threshold, generate a second fault code indicating an incomplete alignment between the vehicle-based charging unit and the ground-based charging unit.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use a the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
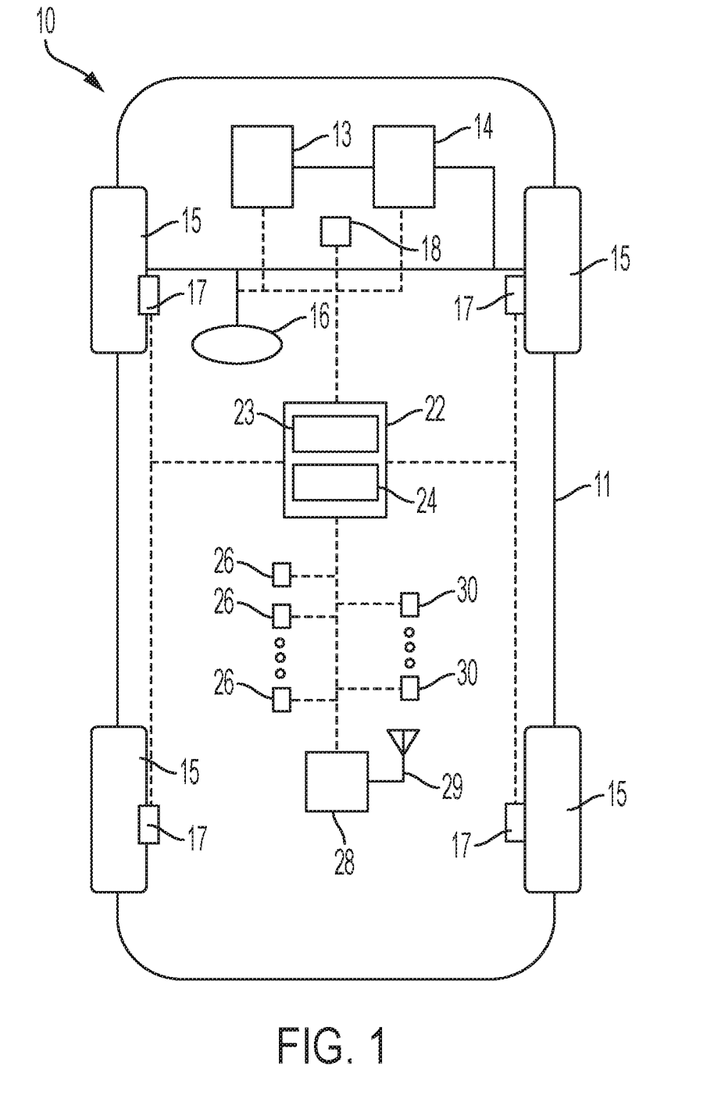
FIG. 1 is a schematic diagram of a vehicle, according to an embodiment of the present disclosure.

FIG. 1 schematically illustrates an automotive vehicle 10 according to the present disclosure. In various embodiments, the vehicle 10 is an autonomous, semi-autonomous, or driver-operated vehicle including a driver-assistance system. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. The vehicle 10 defines a longitudinal axis from the front of the vehicle 10 to the rear of the vehicle 10 and a lateral axis from the left side of the vehicle 10 to the right side of the vehicle 10.

The vehicle 10 generally includes a body 11 and wheels 15. The body 11 encloses the other components of the vehicle 10 and also defines a passenger compartment. The wheels 15 are each rotationally coupled to the body 11 near a respective corner of the body 11.

The vehicle 10 includes a propulsion system 13, which may in various embodiments include an internal combustion engine, an electric machine such as a traction motor and a battery coupled to the traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously variable transmission, or other appropriate transmission.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 additionally includes a braking system including wheel brakes 17 configured to provide braking torque to the vehicle wheels 15. The wheel brakes 17 may, in various embodiments, include friction brakes, a regenerative braking system such as an electric machine, and/or other appropriate braking systems.

In various embodiments, the vehicle 10 also includes a wireless communication system 28 configured to wirelessly communicate with any wireless communication equipped device (vehicle-to-everything or "V2X"), including other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure. Additionally, wireless communication systems configured to communicate with traffic lights, cellular towers or relays, etc. using LTE, 5G, and other communication standards, are also considered within the scope of the present disclosure. In various embodiments, the wireless communication system 28 includes one or more antennas 29 configured to receive and transmit wireless communication signals. In various embodiments, the one or more antennas are directional antennas.

The propulsion system 13, transmission 14, steering system 16, and wireless communication system 28 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In various embodiments, the vehicle 10 includes a vehicle-based charging unit 18 for use in wirelessly charging a battery of the propulsion system 13 of the vehicle 10. The vehicle-based charging unit 18 includes a receiving unit to receive power from an electromagnetic field generated by a ground-based charging unit and converts the power into electric current to charge the vehicle battery. In various embodiments, the vehicle-based charging unit 18 includes at least one inductive coupler (e.g., inductive power transfer (IPT) coupler) that is a single or a multi-coil receiver arrangement of windings of electric current conveying material.

The vehicle-based charging unit 18 is in communication with the controller 22. In various embodiments, the controller 22 includes a wireless power transfer analysis system 24 for receiving and analyzing the power transfer performance and adjusting a position of the vehicle-based charging unit 18 relative to the body 11 of the vehicle 10 and the ground-based charging unit, as discussed in greater detail herein.

In various embodiments, the controller 22 includes an automated driving system (ADS) 23 for automatically controlling various actuators in the vehicle. In an exemplary embodiment, the ADS 23 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 23 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate to capture vehicle characteristic or operating conditions including, for example and without limitation, vehicle speed, acceleration, and steering wheel angle.

In inductive power transfer or IPT systems; an alternating current in the transmitter produces a magnetic field, which induces an electromotive force in a receiver placed in proximity to the transmitter and accordingly transfers power to the receiver. Wireless charging efficiency exponentially decreases, and stray field increases with alignment inaccuracy between the receiver (the vehicle-based charging unit) and the transmitter (the ground-based charging unit) in wireless charging of a vehicle battery. Existing methods of guiding the vehicle 10 to alignment with the ground-based charging unit introduce challenges in accurate alignment in cases of debris and uneven surfaces in the vehicle path, as well as detection inaccuracy. Alignment accuracy may also be affected by vehicle maneuvers within constrained spaces.

The methods and systems discussed herein enable accurate alignment of the vehicle-based charging unit with the ground-based charging unit in situations in which further vehicle movement relative to the ground-based charging unit may be difficult or impractical. The methods and systems discussed herein use coupling coefficient and power transfer performance indicator information to generate control signals to control lateral and longitudinal movement of the vehicle-based charging unit relative to the vehicle and/or the ground-based charging unit using one or more actuators and/or generate control signals to control lateral and longitudinal movement of the ground-based charging unit relative to the vehicle and/or the vehicle-based charging unit using one or more actuators.

Figure 2:
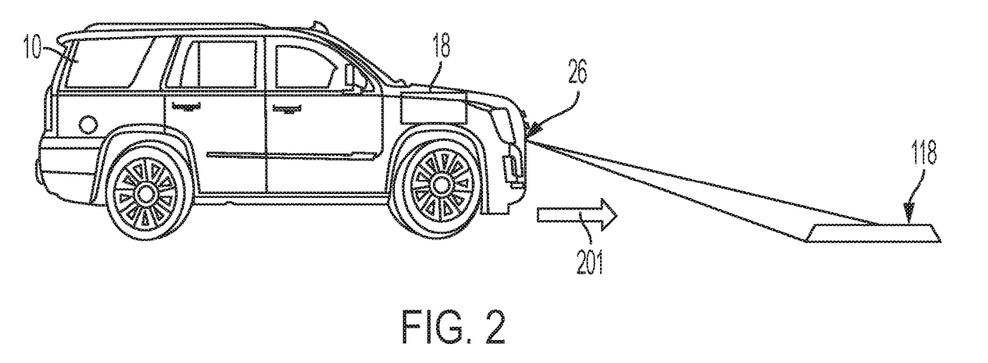
FIG. 2 is a schematic diagram of the vehicle of FIG. 1 approaching a ground-based charging unit, according to an embodiment of the present disclosure.

FIG. 2 illustrates the vehicle 10 approaching a ground-based charging unit 118. The vehicle 10 is illustrated in FIG. 2 as an SUV, however, it may be appreciated that the vehicle 10 may be any type or configuration of vehicle having a chargeable battery. In various embodiments, the ground-based charging unit 118 includes at least one inductive power coupler (e.g., IPT coupler), which may include a single coil or a multi-coil arrangement of windings of electric current conveying material. The sensor 26, which includes, in some embodiments, one or more cameras, assists the ADS 23 to guide the vehicle 10 towards the ground-based charging unit 118 as indicated by the arrow 201. The ADS 23 and the controller 22 generate control signals to control the various systems of the vehicle 10 such that the vehicle-based charging unit 18 has a first alignment with the ground-based charging unit 118. However, the first alignment of the vehicle-based charging unit 18 with the ground-based charging unit 118 may not result in a position in which maximum power transfer performance is achieved.

Figure 3:
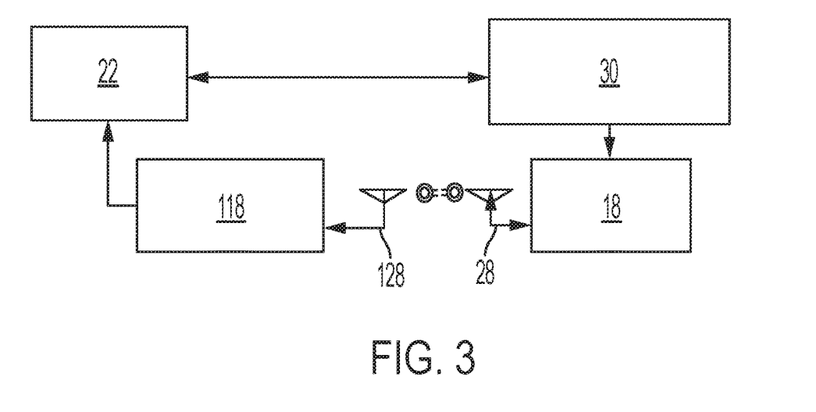
FIG. 3 is a schematic diagram of a system to align a vehicle-based charging unit with a ground-based charging unit, according to an embodiment of the present disclosure.

With reference to FIG. 3, a schematic diagram of a system to align a vehicle-based charging unit with a ground-based charging unit is illustrated. The controller 22 is in communication with one or more actuators 30. The one or more actuators 30 are operably coupled with the vehicle-based charging unit 18 such that the actuators 30 translate or move the vehicle-based charging unit 18 in the lateral and/or longitudinal direction relative to the vehicle 10 and the ground-based charging unit 118.

In various embodiments, the ground-based charging unit 118 includes a controller and a wireless communication system 128. The vehicle-based charging unit 18 is in electronic communication with the wireless communication system 28 of the vehicle 10, either directly or via the controller 22. Communication between the ground-based charging unit 118 and the vehicle-based charging unit 18 are established between the wireless communication systems 128, 28 via any type of wireless communication method, including Bluetooth™ for example and without limitation.

In various embodiments, the controller of the ground-based charging unit 118 estimates the power transfer efficiency between the ground-based charging unit 118 and the vehicle-based charging unit 18 based on a coupling coefficient and transmits this data to the controller 22 or the vehicle-based charging unit 18 via the wireless communication systems 128, 28. In various embodiments, the coupling coefficient is calculated using one or more methods including, for example and without limitation, an open-circuit method, a classic inductance equation, and/or a K-compensation method. In various embodiments, one or more of the methods to calculate the coupling coefficient are used. In various embodiments, the power transfer efficiency is calculated by the controller associated with the ground-based charging unit 118; however, in other embodiments the power transfer efficiency is calculated by the controller 22 of the vehicle 10.

A desired second alignment of the vehicle-based charging unit 18 relative to the vehicle 10 is estimated from the power transfer efficiency. The second alignment includes a desired change in lateral and/or longitudinal position of the vehicle-based charging unit 18 estimated to improve the power transfer efficiency by more accurately aligning the vehicle-based charging unit 18 with the ground-based charging unit 118. In some embodiments, only a change in the lateral position of the vehicle-based charging unit 18 is desired to improve the alignment with the ground-based charging unit 118 and improve the power transfer efficiency. Similarly, in some embodiments, only a change in the longitudinal position of the vehicle-based charging unit 18 is desired to improve the alignment with the ground-based charging unit 118. And in some embodiments, adjustment to both the lateral and the longitudinal position of the vehicle-based charging unit 18 is desired to improve the alignment with the ground-based charging unit 118.

In various embodiments, the controller 22 estimates the change in lateral and/or longitudinal position desired to improve the power transfer efficiency between the vehicle-based charging unit 18 and the ground-based charging unit 118 and generates one or more control signals. The one or more control signals are transmitted to the actuators 130 that act on the ground-based charging unit 118 to adjust the position of the ground-based charging unit 118 to the desired second alignment. In various embodiments, the controller 22 estimates the change in lateral and/or longitudinal position desired to improve the power transfer efficiency and generates one or more control signals to adjust positions of both of the vehicle-based charging unit 18 and the ground-based charging unit 118. In some embodiments, a position adjustment is made to only one of the vehicle-based charging unit 18 and the ground-based charging unit 118.

Figure 4:
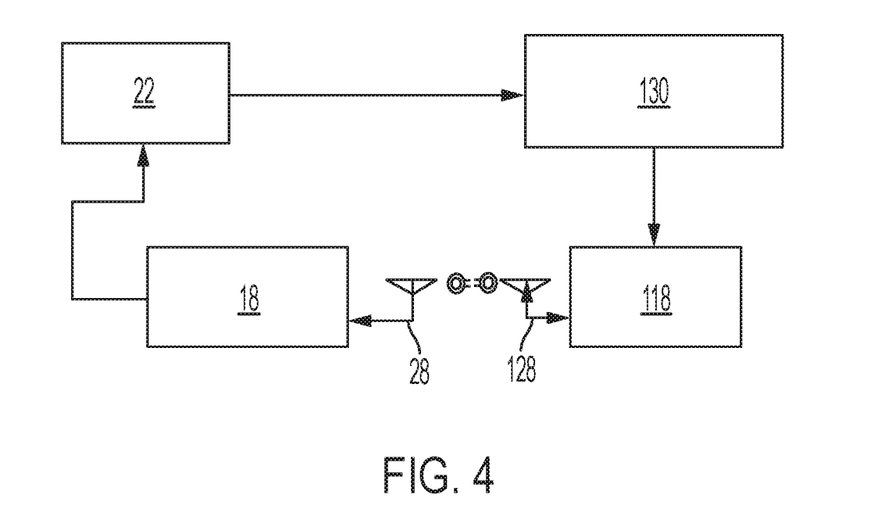
FIG. 4 is a schematic diagram of another system to align a vehicle-based charging unit with a ground-based charging unit, according to an embodiment of the present disclosure.

In some embodiments, as shown in FIG. 4, another system to align a vehicle-based charging unit 18 with a ground-based charging unit 118 is illustrated. In this embodiment, one or more actuators 130 are operably coupled with the ground-based charging unit 118 to adjust a lateral and/or longitudinal position of the ground-based charging unit 118 relative to the vehicle-based charging unit 18. As shown in FIG. 4, the one or more actuators 130 are operably coupled to the ground-based charging unit 118. The one or more actuators 130 are in electronic communication with a controller, such as the controller 22, or another controller separate from the vehicle 10.

Similar to the embodiment shown in FIG. 3, in various embodiments, the ground-based charging unit 118 includes a controller and a wireless communication system 128. The vehicle-based charging unit 18 is in electronic communication with the wireless communication system 28 of the vehicle 10, either directly or via the controller 22. Communication between the ground-based charging unit 118 and the vehicle-based charging unit 18 is established between the wireless communication systems 128, 28 via any type of wireless communication method, including Bluetooth™ for example and without limitation.

As in the embodiment shown in FIG. 3, in various embodiments, the controller, either a vehicle controller such as the controller 22 or a separate controller, estimates the power transfer efficiency between the ground-based charging unit 118 and the vehicle-based charging unit 18 based on a coupling coefficient and transmits this data to the controller 22 or the vehicle-based charging unit 18 via the wireless communication systems 128, 28. In various embodiments, the coupling coefficient is calculated using one or more of an open-circuit method, a classic inductance equation, and/or a K-compensation method, for example and without limitation. In various embodiments, one or more of the methods to calculate the coupling coefficient are used. In various embodiments, the power transfer efficiency is calculated by the controller associated with the ground-based charging unit 118; however, in other embodiments the power transfer efficiency is calculated by the controller 22 of the vehicle 10.

A desired second alignment of the ground-based charging unit 118 relative to the vehicle-based charging unit 18 is estimated from the power transfer efficiency. The second alignment includes a desired change in lateral and/or longitudinal position of the ground-based charging unit 118 determined to improve the power transfer efficiency between the charging units by more accurately aligning the ground-based charging unit 118 with the vehicle-based charging unit 18. In some embodiments, only a change in the lateral position of the ground-based charging unit 118 is desired to improve the alignment with the vehicle-based charging unit 18 and improve the power transfer efficiency. Similarly, in some embodiments, only a change in the longitudinal position of the ground-based charging unit 118 is desired to improve the alignment with the vehicle-based charging unit 18. And, in some embodiments, adjustment to both the lateral and the longitudinal position of the ground-based charging unit 118 is desired to improve the alignment with the vehicle-based charging unit 18.

In various embodiments, the controller 22 estimates the desired change in lateral and/or longitudinal position and generates one or more control signals. The one or more control signals are transmitted to the actuators 130 that act on the ground-based charging unit 118 to adjust the position of the ground-based charging unit 118 to the desired second alignment. And, in some embodiments, adjustment in positions of both of the vehicle-based charging unit 18 and the ground-based charging unit 118 are completed via the actuators 30, 130 to improve the alignment and power transfer efficiency between the charging units.

Figure 5:
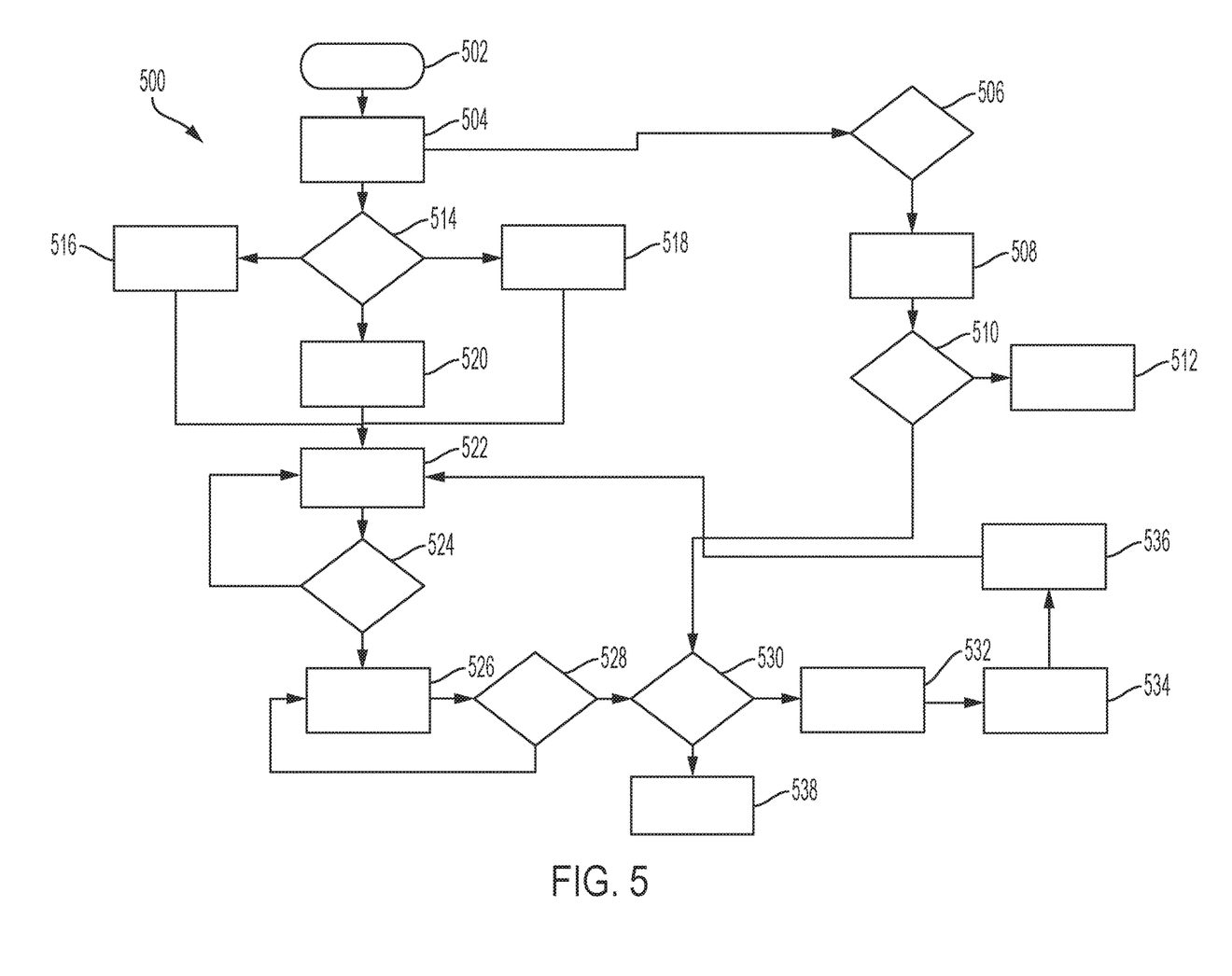
FIG. 5 is a flow diagram of a method for improving an alignment between a vehicle-based charging unit and a ground-based charging unit, according to an embodiment of the present disclosure.

FIG. 5 illustrates a method 500 to improve alignment of a vehicle-based charging unit with a ground-based charging unit. The method 500 can be utilized in connection with the systems discussed herein, including the vehicle-based charging unit 18 and the ground-based charging unit 118. The method 500 can be utilized in connection with the controller 22 as discussed herein, or by other systems associated with or separate from the vehicle, in accordance with exemplary embodiments. The order of operation of the method 500 is not limited to the sequential execution as illustrated in FIG. 5, but may be performed in one or more varying orders, or steps may be performed simultaneously, as applicable in accordance with the present disclosure.

Beginning at 502, the method 500 proceeds to 504. At 504, the controller 22 receives a signal indicative of a command to wirelessly charge the battery of the vehicle 10. The signal may be a command received via a human machine interface, such as an infotainment screen, of the vehicle 10, for example and without limitation. In other embodiments, the signal may be received from the propulsion system 13 indicating a state of the battery charge and indicative of a command to wirelessly charge the battery, for example and without limitation.

From 504, the method 500 proceeds to 506. At 506, the controller 22 determines and confirms that the vehicle-based charging unit 18 and ground-based charging unit 118 are multi-coil configurations compatible for charging the battery. Next, at 508, the controller 22 receives data from the ground-based charging unit 118 including an alignment status and/or coupling coefficient data. The alignment status and/or coupling coefficient data includes, in some embodiments, a power transfer efficiency value indicative of an alignment between one or more of the coils of the vehicle-based charging unit 18 and one or more of the coils of the ground-based charging unit 118. In various embodiments, the controller 22 determines, from the power transfer efficiency value, a first alignment, or misalignment, between the vehicle-based charging unit 18 and the ground-based charging unit 118. The first alignment includes lateral and/or longitudinal position data of the vehicle-based charging unit 18 relative to the ground-based charging unit 118 and vice versa. From 508, the method 500 proceeds to 510.

At 510, the controller 22 determines whether a first condition is satisfied, that is, whether the power transfer efficiency between the ground-based charging unit 118 and the vehicle-based charging unit 18 is equal to or above a predetermined threshold. The power transfer efficiency is a performance indicator reflecting a relative position of one or more of the coils of each of the charging units. When the first condition is satisfied, the relative positions of one or more of the coils of the vehicle-based charging unit 18 and the ground-based charging unit 118 maximize the power transfer efficiency, enabling efficient charging of the vehicle battery. Upon satisfaction of the first condition, the method 500 proceeds to 512. Satisfaction of the first condition indicates that the alignment between one or more of the coils of the vehicle-based charging unit 18 and the ground-based charging unit 118 is satisfactory and charging of the battery of the propulsion system 13 proceeds. In various embodiments, a confirmation notification is generated by the controller 22 and displayed to the operator indicating a successful alignment between the vehicle-based charging unit 18 and the ground-based charging unit 118. Additional adjustment of the relative positions of the ground-based charging unit 118 and the vehicle-based charging unit 18 is not initiated because the alignment between one or more coils of the vehicle-based charging unit 18 and one or more coils of the ground-based charging unit 118 is satisfactory for efficient charging of the vehicle battery.

From 504, in various embodiments, the method 500 proceeds to 514. At 514, the controller 22 receives data from the ground-based charging unit 118 and/or the vehicle-based charging unit 18 indicating an alignment error between the units. In various embodiments, the alignment error occurs when the vehicle-based charging unit 18 is positioned with the first alignment with the ground-based charging unit 118. The controller 22, at 514, determines the error type, that is, whether the alignment error is a misalignment in the lateral direction, the longitudinal direction, or both. The alignment error may be calculated by the controller 22 using the coupling coefficient or power transfer efficiency data to determine a desired position adjustment of one or both of the vehicle-based charging unit 18 and the ground-based charging unit 118 in one or both of the lateral and longitudinal directions to improve alignment of one or more of the coils of the vehicle-based charging unit 18 with one or more of the coils of the ground-based charging unit 118.

From 514, the method 500 proceeds to one of 516, 518, and 520 to adjust a position of one or both of the vehicle-based charging unit 18 and the ground-based charging unit 118 to improve alignment between one or more of the coils of the charging units and improve the power transfer efficiency between the charging units. If the misalignment or alignment error is in the lateral direction, the method 500 proceeds to 516. At 516, the controller 22 determines the lateral adjustment amount and generates an initiation control signal to control the actuator 30 operably coupled to the vehicle-based charging unit 18, or the actuator 130 operably coupled to the ground-based charging unit 118, or both, to adjust a lateral alignment between the vehicle-based charging unit 18 and the ground-based charging unit 118 as determined by the lateral adjustment amount. In various embodiments, the actuator 30 is configured to adjust a lateral position of the vehicle-based charging unit 18 and the actuator 130 is configured to adjust a lateral position of the ground-based charging unit 118 without adjustment to a longitudinal position of either of the charging units.

If the misalignment or alignment error is in the longitudinal direction, the method 500 proceeds to 518. At 518, the controller 22 determines a longitudinal adjustment amount and generates an initiation control signal to control the actuator 30 operably coupled to the vehicle-based charging unit 18, or the actuator 130 operably coupled to the ground-based charging unit 118, or both, to adjust a longitudinal alignment between the vehicle-based charging unit 18 and the ground-based charging unit 118 as determined by the longitudinal adjustment amount. In various embodiments, the actuator 30 is configured to adjust a longitudinal position of the vehicle-based charging unit 18 and the actuator 130 is configured to adjust a longitudinal position of the ground-based charging unit 118 without adjustment to a lateral position of either of the charging units.

If the misalignment or alignment error is in both the lateral and longitudinal directions, the method 500 proceeds to 520. At 520, the controller 22 determines both the lateral and longitudinal adjustment amounts and generates an initiation control signal to control the one or more actuators 30 operably coupled to the vehicle-based charging unit 18, or the one or more actuators 130 operably coupled to the ground-based charging unit 118, or both, to adjust both a lateral and a longitudinal alignment between the vehicle-based charging unit 18 and the ground-based charging unit 118 as determined by the lateral and longitudinal adjustment amounts.

From 516, 518, and 520, the method 500 proceeds to 522. At 522, the controller 22 generates a first control signal to control the actuator 30 and/or the actuator 130 based on the estimated lateral and/or longitudinal position adjustment. In various embodiments, the first control signal controls the one or more actuators 30 to move the vehicle-based charging unit 18 in a first, or positive direction. In various embodiments, the first control signal controls the one or more actuators 130 to move the ground-based charging unit 118 in a first, or positive direction.

Next, at 524, the controller 22 determines whether a second condition is satisfied, that is, whether the power transfer efficiency or performance indicator between the vehicle-based charging unit 18 and the ground-based charging unit 118 is increasing, that is, that an alignment between one or more coils of the vehicle-based charging unit 18 and the ground-based charging unit 118 is improved. Upon satisfaction of the second condition, that is, the power transfer efficiency is increasing, the method 500 returns to 522 to continue the actuator control discussed above.

When the second condition is not satisfied, that is, the power transfer efficiency is not increasing the method 500 proceeds to 526. At 526, the controller 22 generates a second control signal to control the actuator 30 and/or the actuator 130 based on the estimated lateral and/or longitudinal position adjustment. In various embodiments, the second control signal controls the one or more actuators 30 to move the vehicle-based charging unit 18 in a second, or negative direction opposite the first direction. In various embodiments, the second control signal controls the one or more actuators 130 to move the ground-based charging unit 118 in a second, or negative direction opposite the first direction.

Next, at 528, the controller 22 determines whether the second condition is satisfied, that is, whether the power transfer efficiency or performance indicator between the vehicle-based charging unit 18 and the ground-based charging unit 118 is increasing, that is, that an alignment between one or more coils of the vehicle-based charging unit 18 and the ground-based charging unit 118 is improved. Upon satisfaction of the second condition, that is, the power transfer efficiency is increasing, the method 500 returns to 526 to continue the actuator control discussed above.

When the second condition is not satisfied, that is, the power transfer efficiency is not increasing, the method 500 proceeds to 530. When the alignment status and/or coupling coefficient data received by the controller 22 from the ground-based charging unit 118 at 508 does not indicate that the power transfer efficiency is above the predetermined threshold (that is, the first condition is not satisfied at step 510), the method 500 also proceeds to 530 from 510.

At 530, the controller 22 determines whether a third condition is satisfied, that is, whether a movement threshold has been reached for one or more of the actuators 30 and/or one or more of the actuators 130. The movement threshold represents the maximum movement of the vehicle-based charging unit 18 and/or the ground-based charging unit 118 in either or both of the lateral and longitudinal directions by the actuators, that is, further movement in either or both of the lateral and longitudinal directions is not possible. In various embodiments, when the actuator-controlled charging units reach the movement threshold, the performance indicator, as determined by the controller 22, is not optimized. When the third condition is not satisfied, that is, the movement threshold has not been reached, the method 500 proceeds to 532.

Next, at 532, the controller 22 determines the direction in which the position of the vehicle-based charging unit 18 and/or the ground-based charging unit 118 should be adjusted to improve the alignment. The controller 22 determines whether additional movement or a second position adjustment in the lateral and/or longitudinal direction is desired to improve the alignment between the vehicle-based charging unit 18 and the ground-based charging unit 118. In various embodiments, the controller 22 determines whether movement in one direction is complete while movement in the other direction is incomplete.

When the controller 22 determines the direction of adjustment to the position of the vehicle-based charging unit 18 and/or the ground-based charging unit 118, the method 500 proceeds to 534. At 534, the controller 22 generates a second initiation control signal to initiate the desired additional lateral and/or longitudinal position adjustment of the vehicle-based charging unit 18 and/or the ground-based charging unit 118. As discussed above, the desired additional position adjustment is based on an analysis of the performance indicator at various points throughout the method 500. The additional movement may be in either the positive or the negative direction of one or both of the lateral and the longitudinal directions.

The method 500 then proceeds to 536 in which the controller 22 converts the desired movement determined in steps 532 and 534 to an actuator motor command. The method 500 continues to 522 and the controller 22 generates a third control signal to control the actuator 30 and/or the actuator 130 based on the desired additional lateral and/or longitudinal position adjustment. The method 500 then proceeds through the loop sequence once or twice depending on whether additional position adjustments are desired to improve the power transfer efficiency. For example, in some embodiments, the controller 22 determines, at 532, that a position adjustment is desired in the lateral direction only. In this example, the loop sequence is performed once. In another example, in some embodiments, the controller 22 determines, at 532, that a position adjustment is desired in the longitudinal direction only. In this example, the loop sequence is performed once. However, in other embodiments, the controller 22 determines, at 532, that a position adjustment is desired in both the lateral and longitudinal directions. In this example, the loop sequence is performed twice.

However, when the third condition, determined at 530, is satisfied, that is, when a movement threshold has been reached for one or more of the actuators 30 and/or one or more of the actuators 130, the method 500 proceeds to 538. At 538, the controller 22 generates an error message that may be displayed to the operator and/or transmitted to the ADS 23 that the desired alignment between one or more of the coils of the vehicle-based charging unit 18 and the ground-based charging unit 118 cannot be completed. In various embodiments, the controller 22 also records or initiates one or more faults as a diagnostic of one or both of the vehicle-based charging unit 18 and the ground-based charging unit 118.

As noted herein, the method 500 is used, in some embodiments, to generate one or more control signals to control one or more actuators to adjust a position of the vehicle-based charging unit 18 relative to the vehicle 10 and the ground-based charging unit 118 to improve alignment between the charging units when the ground-based charging unit 118 is stationary. In other embodiments, the method 500 is used to generate one or more control signals to adjust a position of the ground-based charging unit 118 relative to the vehicle 10 and the vehicle-based charging unit 18 to improve the alignment between the charging units. In other embodiments, the method 500 is used to generate one or more control signals to control one or more actuators to adjust a position of both of the vehicle-based charging unit 18 and the ground-based charging unit 118 to improve alignment between the charging units.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for adjusting a relative position between a vehicle-based charging unit of a vehicle and a ground-based charging unit, comprising:

providing a first actuator operably coupled to the vehicle-based charging unit and configured to adjust a first position of the vehicle-based charging unit relative to the ground-based charging unit, a second actuator operably coupled to the vehicle-based charging unit and configured to adjust a second position of the vehicle-based charging unit relative to the ground-based charging unit, a third actuator operably coupled to the ground-based charging unit and configured to adjust a position of the ground-based charging unit relative to the vehicle-based charging unit, and a controller configured to selectively actuate the first actuator, the second actuator, and the third actuator;

receiving, by the controller, first performance indicator data indicating a first alignment between the vehicle-based charging unit and the ground-based charging unit, the first performance indicator data indicating a misalignment between the vehicle-based charging unit and the ground-based charging unit;

determining, by the controller, an alignment error between the vehicle-based charging unit and the ground-based charging unit;

calculating a first position adjustment of the vehicle-based charging unit relative to the ground-based charging unit;

automatically controlling, by the controller, the first actuator, the second actuator, and the third actuator to implement the first position adjustment of the vehicle-based charging unit relative to the ground-based charging unit while a power transfer efficiency is increasing as the vehicle-based charging unit is in motion in a first direction relative to the ground-based charging unit;

automatically stopping, by the controller, the motion in the first direction in response to the power transfer efficiency decreasing;

automatically controlling, by the controller, the first actuator, the second actuator, and the third actuator to implement another position adjustment of the vehicle-based charging unit relative to the ground-based charging unit while the power transfer efficiency is increasing as the vehicle-based charging unit is in motion in a second direction relative to the ground-based charging unit, and the second direction is opposite the first direction;

automatically stopping, by the controller the second motion in response to the power transfer efficiency decreasing; and receiving, by the controller, second performance indicator data indicating a second alignment between the vehicle-based charging unit and the ground-based charging unit after the second motion has stopped, the second alignment resulting in a desired power transfer efficiency between the vehicle-based charging unit and the ground-based charging unit.

2. The method of claim 1, wherein the first position adjustment is an adjustment to a lateral position, a longitudinal position, or both of the lateral position and the longitudinal position of the vehicle-based charging unit relative to the ground-based charging unit.

3. The method of claim 1 wherein
an adjustment to the first position moves the vehicle-based charging unit in a lateral direction,
an adjustment to the second position moves the vehicle-based charging unit in a longitudinal direction, and
the controller is configured to selectively actuate both of the first actuator and the second actuator to implement the first position adjustment of the vehicle-based charging unit.

4. The method of claim 1 further comprising:
determining, by the controller, a second position adjustment of the vehicle-based charging unit after the stopping of the second motion; and
automatically controlling, by the controller, at least one of the first actuator and the second actuator to implement the second position adjustment of the vehicle-based charging unit.

5. The method of claim 4, wherein the second position adjustment is an adjustment to a lateral position, a longitudinal position, or both of the lateral position and the longitudinal position of the vehicle-based charging unit.

6. The method of claim 1 further comprising:
determining, by the controller, if a first movement threshold has been reached for the first actuator; and
generating, by the controller, a first fault code indicating an incomplete alignment between the vehicle-based charging unit and the ground-based charging unit in response to the first actuator reaching the first movement threshold.

7. The method of claim 6 further comprising:
determining, by the controller, if a second movement threshold has been reached for the second actuator; and
generating, by the controller, a second fault code indicating an incomplete alignment between the vehicle-based charging unit and the ground-based charging unit in response to the second actuator reaching the second movement threshold.

8. The method of claim 1, wherein:
the first performance indicator data includes the power transfer efficiency between the vehicle-based charging unit and the ground-based charging unit; and
the power transfer efficiency data is below a power transfer efficiency threshold while the vehicle-based charging unit and the ground-based charging unit are misaligned.

9. The method of claim 1, wherein the second performance indicator data indicates that the power transfer efficiency between the vehicle-based charging unit and the ground-based charging unit is greater than indicated in the first performance indicator data.

10. The method of claim 1, wherein:
the vehicle-based charging unit includes a first plurality of coils;
the ground-based charging unit includes a second plurality coils; and
the second alignment includes alignment of at least one of the first plurality of coils with at least one of the second plurality of coils such that the second performance indicator data indicates an improved power transfer efficiency between the ground-based charging unit and the vehicle-based charging unit.

11. A method for adjusting a relative position between a vehicle-based charging unit of a vehicle and a ground-based charging unit, comprising:

providing a first actuator operably coupled to the ground-based charging unit and configured to adjust a first position of the ground-based charging unit relative to the vehicle-based charging unit, and a controller configured to selectively actuate the first actuator;
providing an automated driving system configured to control braking, acceleration, and steering of the vehicle in an autonomous mode to adjust a relative position between the vehicle-based charging unit and the ground-based charging unit;
receiving, by the controller, first power transfer efficiency data indicating a first alignment between the vehicle-based charging unit and the ground-based charging unit, the first power transfer efficiency data indicating a misalignment between the vehicle-based charging unit and the ground-based charging unit;
determining, by the controller, an alignment error between the vehicle-based charging unit and the ground-based charging unit;
calculating a first position adjustment of the ground-based charging unit;
automatically controlling, by the controller, the first actuator to implement the first position adjustment of the ground-based charging unit relative to the vehicle-based charging unit while a power transfer efficiency is increasing as the ground-based charging unit is in motion in a first direction relative to the vehicle-based charging unit;
automatically stopping, by the controller, the motion in the first direction in response to the power transfer efficiency decreasing;
automatically controlling, by the controller, the first actuator to implement another position adjustment of the ground-based charging unit relative to the vehicle-based charging unit while the power transfer efficiency is increasing as the ground-based charging unit is in motion in a second direction relative to the vehicle-based charging unit, and the second direction is opposite the first direction;
automatically stopping, by the controller, the second motion in response to the power transfer efficiency decreasing; and
receiving, by the controller, second power transfer efficiency data indicating a second alignment between the vehicle-based charging unit and the ground-based charging unit after the second motion has stopped, the second alignment resulting in a desired power transfer efficiency between the vehicle-based charging unit and the ground-based charging unit.

12. The method of claim 11 further comprising:
providing a second actuator operably coupled to the ground-based charging unit and configured to adjust a second position of the ground-based charging unit relative to the vehicle-based charging unit, wherein:
an adjustment to the first position moves the ground-based charging unit in a lateral directions;
an adjustment to the second position moves the ground-based charging unit in a longitudinal direction; and
the controller is configured to selectively actuate both of the first actuator and the second actuator to implement the first position adjustment of the ground-based charging unit.

13. The method of claim 12 further comprising:
determining, by the controller, a second position adjustment of the ground-based charging unit; and automatically controlling, by the controller, at least one of the first actuator and the second actuator to implement the second position adjustment of the ground-based charging unit.

14. The method of claim 11, wherein while the vehicle-based charging unit and the ground-based charging unit are misaligned, the power transfer efficiency is below a power transfer efficiency threshold.

15. The method of claim 11, wherein the second power transfer efficiency data indicates that the power transfer efficiency between the vehicle-based charging unit and the ground-based charging unit is greater than indicated in the first performance indicator data.

16. The method of claim 11, wherein:
the vehicle-based charging unit includes a first plurality of coils; and
the ground-based charging unit includes a second plurality coils; and
the second alignment includes alignment of at least one of the first plurality of coils with at least one of the second plurality of coils such that the second power transfer efficiency data indicates an improved power transfer efficiency between the ground-based charging unit and the vehicle-based charging unit.

17. An automotive vehicle, comprising:
an automated driving system configured to control braking, acceleration, and steering of the automotive vehicle in an autonomous mode;
a vehicle-based charging unit including a receiving unit configured to receive power from a ground-based charging unit, the receiving unit including a multi-coil receiver;
a first actuator operably coupled to the vehicle-based charging unit and configured to adjust a first position of the vehicle-based charging unit relative to the ground-based charging unit;
a second actuator operably coupled to the vehicle-based charging unit and configured to adjust a second position of the vehicle-based charging unit relative to the ground-based charging unit; and
a controller configured to selectively actuate the first actuator and the second actuator, the controller configured to:
receive first performance indicator data indicating a first alignment between the vehicle-based charging unit and the ground-based charging unit, the first performance indicator data indicating a misalignment between the vehicle-based charging unit and the ground-based charging unit;
determine an alignment error between the vehicle-based charging unit and the ground-based charging unit;
calculate a first position adjustment of the vehicle-based charging unit based on the alignment error;
automatically control vehicle braking, acceleration, and steering of the automotive vehicle via the automated driving system to implement the first position adjustment of the vehicle-based charging unit;
automatically control the first actuator and the second actuator to implement the first position adjustment of the vehicle-based charging unit relative to the vehicle-based charging unit while a power transfer efficiency is increasing as the vehicle-based charging unit is in motion in a first direction relative to the ground-based charging unit;
automatically stop the motion in the first direction in response to the power transfer efficiency decreasing;
automatically control the first actuator and the second actuator to implement another position adjustment of the vehicle-based charging unit relative to the ground-based charging unit while the power transfer efficiency is increasing as the vehicle-based charging unit is in motion in a second direction relative to the ground-based charging unit, and the second direction is opposite the first direction;
automatically stop the second motion in response to the power transfer efficiency decreasing; and
receive second performance indicator data indicating a second alignment between the vehicle-based charging unit and the ground-based charging unit after the second motion has stopped, the second alignment resulting in a desired power transfer efficiency between the vehicle-based charging unit and the ground-based charging unit.

18. The automotive vehicle of claim 17 wherein:
an adjustment to the first position moves the vehicle-based charging unit in a lateral directions;
an adjustment to the second position moves the vehicle-based charging unit in a longitudinal directions; and
the controller is configured to selectively actuate both of the first actuator and the second actuator to implement the first position adjustment of the vehicle-based charging unit.

19. The automotive vehicle of claim 18, wherein the controller is further configured to:
determine a second position adjustment of the vehicle-based charging unit; and
automatically control at least one of the first actuator and the second actuator to implement the second position adjustment of the vehicle-based charging unit.

20. The automotive vehicle of claim 17, wherein the controller is further configured to:
determine if a first movement threshold has been reached for the first actuator;
generate a first fault code indicating an incomplete alignment between the vehicle-based charging unit and the ground-based charging unit in response to the first actuator reaching the first movement threshold;
determine if a movement threshold has been reached for the second actuator and
generate a second fault code indicating an incomplete alignment between the vehicle-based charging unit and the ground-based charging unit in response to the second actuator reaching the second movement threshold.

* * * * *